INVENTORS
Mark E. Faulhaber
Peter G. Witherell
BY Harry J. McCauley
ATTORNEY

INVENTORS
Mark E. Faulhaber
Peter G. Witherell
BY Harry J. McCauley
ATTORNEY

United States Patent Office 3,512,893
Patented May 19, 1970

---

3,512,893
COLOR DIFFERENCE METER
Mark E. Faulhaber and Peter G. Witherell, Wilmington,
Del., assignors to E. I. du Pont de Nemours and Company, Wilmington, Del., a corporation of Delaware
Filed Dec. 18, 1967, Ser. No. 691,412
Int. Cl. G01j 3/46, 3/48, 3/50
U.S. Cl. 356—176                       2 Claims

ABSTRACT OF THE DISCLOSURE

A colorimeter determining directly the substantially visually uniform color difference coordinate values $$\Delta L = Q(G_{Sam.}^{1/p} - G_{Ref.}^{1/p})$$

$$\Delta a = A(R_{Sam.}^{1/p} - R_{Ref.}^{1/p}) - M\Delta L$$

and $$\Delta b = C\Delta L - N(B_{Sam.}^{1/p} - B_{Ref.}^{1/p})$$

existing between a pair of specimens consisting of a Sample (Sam) and a Reference (Ref).

BRIEF SUMMARY OF THE INVENTION

Generally, this invention comprises a direct-reading tristimulus color difference meter wherein corresponding electrical signals are produced responsive to the (G)reen, (R)ed and (B)lue spectral radiations when the Reference (Ref) specimen is first individually viewed, the $p$th roots of these signals obtained and the voltage levels $$G_{Ref.}^{1/p}, R_{Ref.}^{1/p}$$

and $$B_{Ref.}^{1/p}$$

preserved by null-balancing against an external potential source, then the Sample (Sam) is substituted, and corresponding electrical signals are produced responsive to the same (G)reen, (R)ed and (B)lue spectral radiations, the $p$th roots $$G_{Sam.}^{1/p}, R_{Sam.}^{1/p}$$

and $$B_{Sam.}^{1/p}$$

obtained and the respective preserved electrical voltage signals $$G_{Ref.}^{1/p}, R_{Ref.}^{1/p}$$

and $$B_{Ref.}^{1/p}$$

subtracted therefrom to obtain the differences $$(G_{Sam.}^{1/p} - G_{Ref.}^{1/p}), (R_{Sam.}^{1/p} - R_{Ref.}^{1/p})$$

and $$(B_{Sam.}^{1/p} - B_{Ref.}^{1/p})$$

multiplying these differences by the respective constants Q (to give $\Delta L$), A and N to give one term each of the $\Delta a$ and $\Delta b$ equations and thereafter subtracting $M\Delta L$ from $$A(R_{Sam.}^{1/p} - R_{Ref.}^{1/p})$$

to give $\Delta a$ and subtracting $$N(B_{Sam.}^{1/p} - B_{Ref.}^{1/p})$$

from $C\Delta L$ to give $\Delta b$, and, finally, indicating the magnitudes of the color difference coordinate values $\Delta L$, $\Delta a$ and $\Delta b$.

DRAWINGS

The construction of a preferred embodiment of this invention is detailed in the drawings attached, of which:

FIG. 7 is a detailed electrical circuit of the amplification section of one channel of the apparatus of FIGS. 1–4, FIGS. 8, 9, 10 and 11 are detailed electrical circuits for.

DETAILED DESCRIPTION

Tristimulus color comparison of a sample (Sam) and a reference (Ref) is generally based on measured transmitted or reflected radiation intensities of green (G), red (R) and blue (B) spectral distributions similar to those defined by the Commission Internationale de l' Clairage, abbreviated C.I.E. (corresponding to the anglicized ICI) for a standard observer. Transformation, however, into terms of $\Delta L$, $\Delta a$ and $\Delta b$ constituting visually uniform color scoordinate values, where L is characterized as lightness-darkness, $a$ as redness-greenness and $b$ as yellowness-blueness provides data more readily useful for industrial purposes of color grading or sorting, color formulation or the like.

Various systems have been devised for the quantitative expression of the color-difference coordinates $\Delta L$, $\Delta a$ and $\Delta b$, in substantially visually uniform representation. One widely accepted is the Cube Root Color Coordinate System, because it provides accurate visually uniform coordinates over a very wide range, these being defined as follows:

$$\Delta L = 25.29 \, (G_{Sam.}^{1/3} - G_{Ref.}^{1/3})$$

$$\Delta a = 106.0 \, [(R_{Sam.}^{1/3} - R_{Ref.}^{1/3}) - (G_{Sam.}^{1/3} - G_{Ref.}^{1/3})]$$

and $$\Delta b = 42.34 \, [(G_{Sam.}^{1/3} - G_{Ref.}^{1/3}) - (B_{Sam.}^{1/3} - B_{Ref.}^{1/3})]$$

More broadly, however, the substantially uniform color difference coordinates can be expressed as:

$$\Delta L = Q(G_{Sam.}^{1/p} - G_{Ref.}^{1/p})$$

$$\Delta a = A(R_{Sam.}^{1/p} - R_{Ref.}^{1/p}) - M\Delta L$$

and $$\Delta b = C\Delta L - N(B_{\text{Sam.}}^{1/p} - B_{\text{Ref.}}^{1/p})$$

where Q, A, C, M and N are constants, p is a number in the approximate range of .2–4 and G, R and B are, respectively, radiation intensities corresponding to preselected portions of the green, red and blue spectra, and the color difference meter of this invention is adapted to conduct color comparisons pursuant to the wide variety of systems of quantitative expressions coming within the general formulae set out.

For purposes of specificity, this invention will be described with particular application to a reflecting type apparatus determining color values according to the Cube Root Color Coordinate System, as to which FIGS. 1–3 relate.

Figure 1:
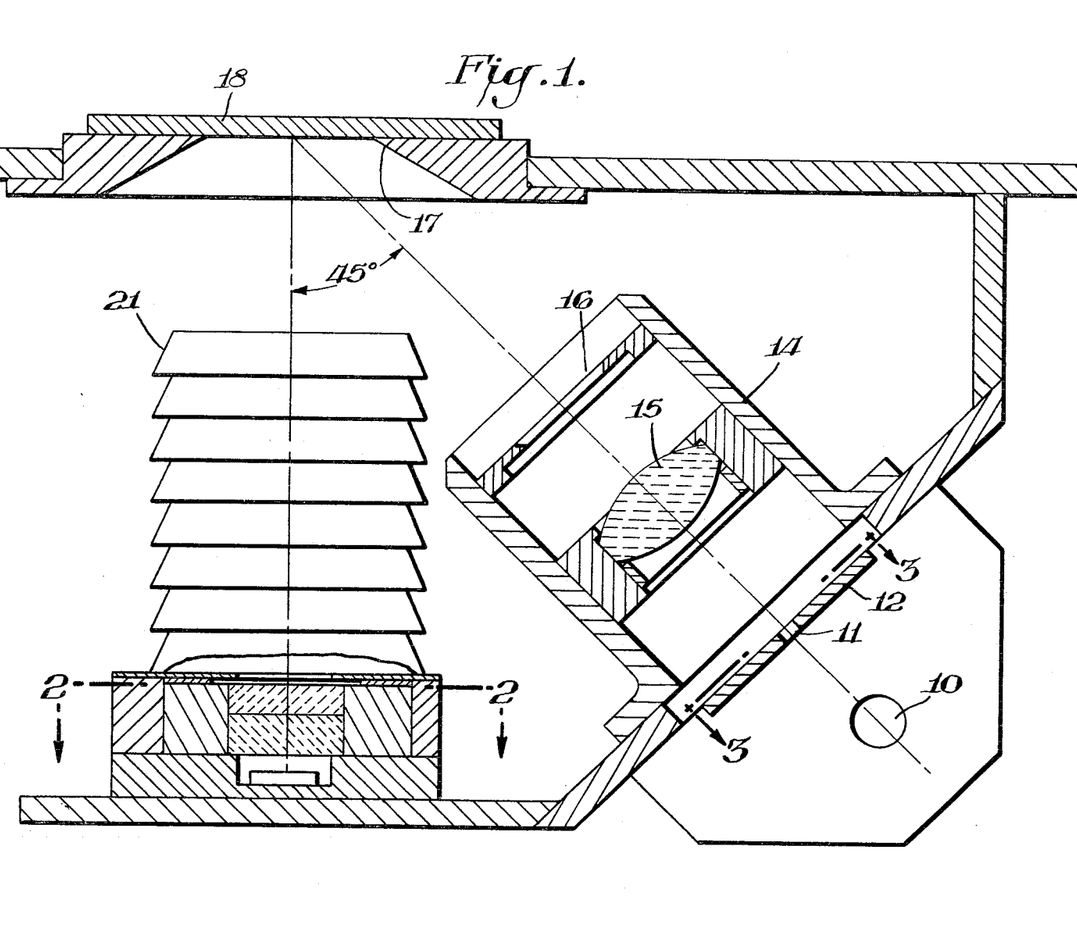
FIG. 1 is a partially schematic side elevational section view of the optical arrangement for a sequentially viewing color-difference meter according to this invention.
Figures 2, 3:
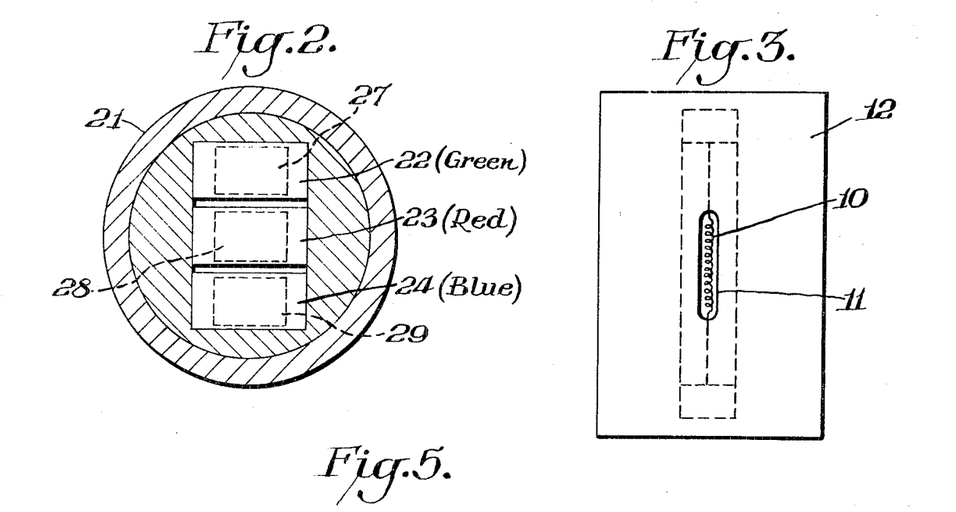
FIG. 2 is a sectional view taken on line 2—2, FIG. 1.
FIG. 3 is a sectional view taken on line 3—3, FIG. 1.

The optical assembly for this sequentially viewing apparatus shown in FIG. 1 utilizes a light source 10 typically consisting of a tungsten-iodine cycle lamp (e.g., a General Electric Corp. Model 6.6A/T 2½ Q/CL–45 watts, or equivalent) provided with its own regulated power supply, not detailed, which can be a Sorenson Model QB 6–8. The light is supplied via a somewhat rectangular slit 11 (refer FIG. 3 particularly) machined in a metal lamp masking plate 12, and thence passes through a light-opaque tube 14 provided with a collimating lens 15 and a circular aperture 16 directly to the center of the apparatus specimen-viewing port 17. Here the light impinges at an angle of 45° on a sample or reference under test, indicated generally at 18, from whence the diffusely reflected light passes through a light-collecting tube 21 simultaneously through the three individual Green, Red and Blue filters 22–24 shown in FIG. 2, upon the three individual photodetectors 27–29, respectively, underlying these separate filters. The photodetectors employed are preferably silicon solar cells, typically Radio Corporation of America type SL–2205.

The filters employed in a typical apparatus were combinations of glass color filter material from Corning Glass Works, of which the Red filter 23 was 1.05ST (stock thickness) #3304 overlaid with a 1.03ST piece of #9788 Corning Glass Filter Stock, Green filter 22 was 0.85ST of #3307 plus 1.25ST of #4784, and Blue filter 24 was 1.66ST of #5543 with 1.09ST of #3389 and 1.0ST of #9788.

The optical arrangement described provides the standard 45° illumination referred to 0° (perpendicular, or normal) which is a usual standard practice in colorimetry and, with the filters interposed between the specimens under examination and the photodetectors 27–29, the apparatus also detects visible fluorescence effects arising from specimen exposure to light.

Figure 4:
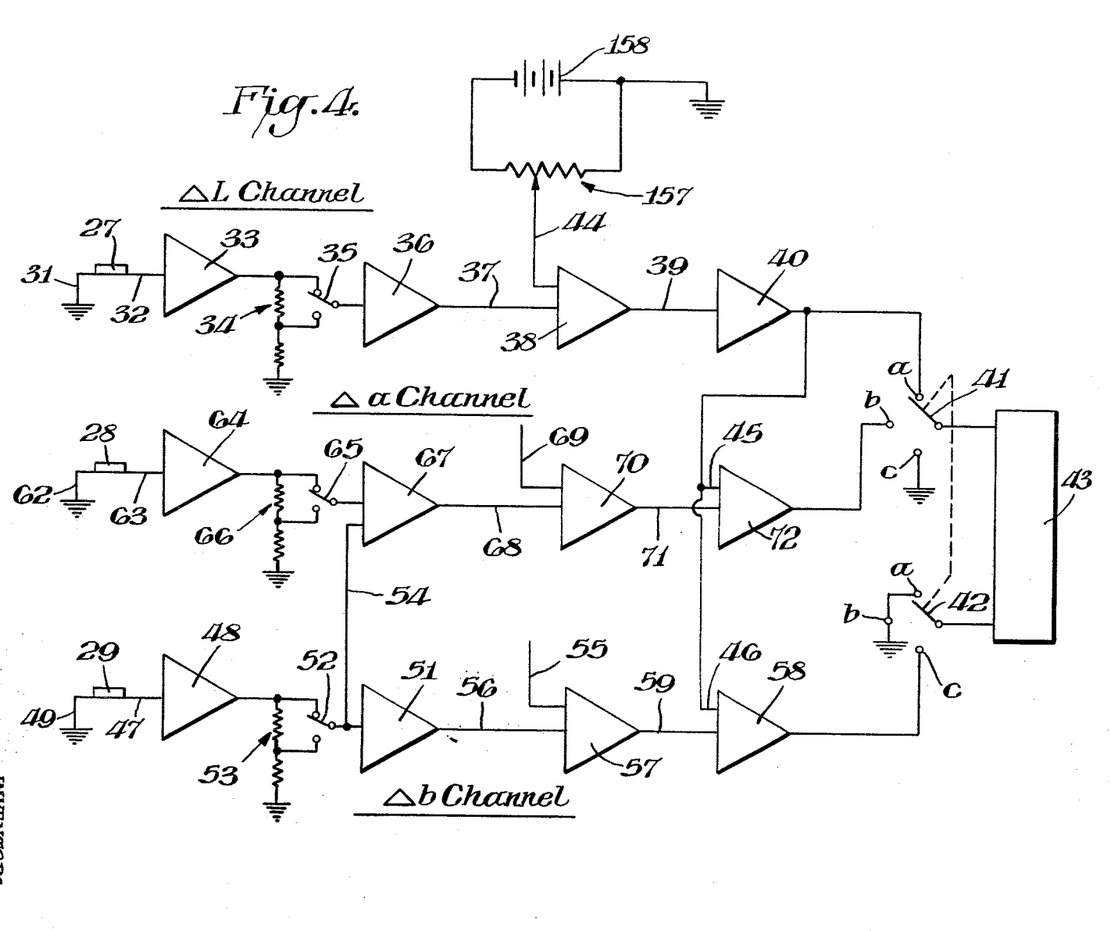
FIG. 4 is a block diagram of the electrical circuit for the color difference meter of FIG. 1.

Referring to FIG. 4, understanding of the electrical circuitry is facilitated by considering it as made up of three closely identical parallel channels of which the first, incorporating Green photodetector 27, can be considered to be the $\Delta L$ channel, whereas that incorporating Blue photodetector 29 is the $\Delta b$ channels and that corporating Red photodetector 28 is the $\Delta a$ channel. These three channels operate simultaneously.

Describing the $\Delta L$ channel first, Green photodetector 27 is connected via one lead 31 to ground with delivery of its D.C. current output signal proportional to the tristimulus value G incident thereon through lead 32 running to the input side of amplifier 33. The output of amplifier 33 is a voltage proportional to the photodetector current which is passed via switch 35 to the input side of cube root-determing amplifier 36, which computes a voltage proportional to $$\sqrt[3]{G}$$

or $G^{1/3}$, which is delivered via lead 37 to amplifier 38. Resistance network 34 and switch 35 collectively constitute calibration means hereinafter detailed.

To provide additional amplification and/or polarity reversal required for the $\Delta a$ and $\Delta b$ channels, the voltage signal next passes via lead 39 to amplifier 40, the output of which is delivered via contact $a$ of three-contact switch 41, ganged for simultaneous operation with identical switch 42 as indicated by the broken connection line therebetween, to output meter 43. The other lead of meter 43 is connected to ground through the $a$ contact of switch 42.

If a voltage of opposite polarity and equal magnitude to that impressed on amplifier 38 from lead 37 is introduced via lead 44 into amplifier 38, the amplifier output will be zero and the balance between the two voltages will be indicated by a zero reading of output meter 43 when switches 41 and 42 are closed on their $a$ contacts. Moreover, the voltage impressed through lead 44, being in known linear relationship to the value of the cube root of the amplified photodetector output to which it opposed, constitutes a stored magnitude value of the cube root of this spectral counterpart.

As an example, in the determination of $\Delta L$, when the Reference specimen is placed over port 17 the Green spectral value is obtained from photodetector 27, following which the cube root output from amplifier 36, a voltage representative of $$G_{\text{Ref.}}^{1/3}$$

is delivered via lead 37, whereupon a counter potential of equal magnitude imposed through lead 44 will store this value representative of $$-G_{\text{Ref.}}^{1/3}$$

Then, if the Sample to be compared with the Reference is substituted in position over port 17, a voltage signal representative of $$G_{\text{Sam.}}^{1/3}$$

will be generated at lead 37 which, when opposed to $$-G_{\text{Ref.}}^{1/3}$$

stored on lead 44, yields a quantity representative of $$(G_{\text{Sam.}}^{1/3} - G_{\text{Ref.}}^{1/3})$$

If this is multiplied by an appropriate factor through the combined gains of amplifiers 38 and 40, the output of amplifier 40 will have the value of $\Delta L = 25.29$ $$(G_{\text{Sam.}}^{1/3} - G_{\text{Ref.}}^{1/3})$$

which can be read directly on output meter 43. Since the term $\Delta L$ is required for computation of both $\Delta a$ and $\Delta b$, its value is imported into each of these channels via leads 45 and 46, respectively, each introducing a second input to the last stage amplifiers of these two channels.

The negative counter potential applied to lead 44 (or to corresponding leads 55 and 69 in the other two channels) is conveniently obtained by making this lead the tap of a potentiometer 157, connected across a suitable D-C potential source 158 having its positive side grounded, which sub-circuit is detailed only for the $\Delta L$ channel in FIG. 4.

For $\Delta b$ the operation is similar to that of the $\Delta L$ channel described, in that photodetector 29 generates a D-C electrical current signal proportional to Blue radiation incident upon it from filter 24 and this is passed via lead 47 to amplifier 48, corresponding to amplifier 33. Photodetector 29 is also provided with a grounding lead 49.

The output voltage signal from amplifier 48 is impressed as the input to amplifier 51 via switch 52, which, together with resistance network 53, constitutes a calibration means hereinafter detailed. Since a fractional part of the Blue value is optionally required in the $\Delta a$ channel, this can be supplied as a second input to amplifier 67 thereof via lead 54. Amplifier 51 computes a voltage proportional to $$\sqrt[3]{B}$$

or $B^{1/3}$, which is delivered via lead 56 to amplifier 57. Lead 55, connected with the input side of amplifier 57, introduces a counter potential of equal magnitude but opposite polarity to the signal voltage impressed via lead 56, thereby effectively storing $$-B_{\text{Ref.}}^{1/3}$$

in the same manner as already described for $$-G_{\text{Ref.}}^{1/3}$$

in the ΔL channel.

Since Δb requires the combination of greenness and blueness information, this combination is accomplished in amplifier 58. One input to amplifier 58 is introduced via lead 46 and has a value of ΔL, equal to 25.29

$$(G_{\text{Sam.}}^{1/3} - G_{\text{Ref.}}^{1/3})$$

and amplifier 58 is set to provide a gain of 42.34/25.29 for this electrical signal voltage in order to provide the appropriate coefficient for the ΔL (greenness) contribution to Δb. The second input to amplifier 58 is introduced via lead 59, which is the output of amplifier 57 representative of the difference signal $$(B_{\text{Sam.}}^{1/3} - B_{\text{Ref.}}^{1/3})$$

but of opposite polarity to the input from lead 46. The gain of amplifier 57 is adjusted to provide the necessary coefficient for the electrical voltage signal representative of $$(B_{\text{Sam.}}^{1/3} - B_{\text{Ref.}}^{1/3})$$

so that the output of amplifier 58 has the value $$\Delta b = 42.34\,[(G_{\text{Sam.}}^{1/3} - G_{\text{Ref.}}^{1/3}) - (B_{\text{Sam.}}^{1/3} - B_{\text{Ref.}}^{1/3})]$$

The output of amplifier 58 has the actual value $-\Delta b$, due to the polarity reversal that occurs in the computer amplifiers. However, Δb is readable directly on meter 43 by introducing the signal to the meter through reversed leads, which is accomplished by impressing the $-\Delta b$ output signal voltage from amplifier 58 on contact $c$ of switch 42, thereby opposing this to ground as reference when the other lead of meter 43 is connected to ground through the $c$ contact of switch 41.

The Δa channel is similar to the ΔL and Δb channels hereinbefore described, incorporating photodetector 28 responsive to Red radiation incident thereon by passage through red filter 23, the detector being provided with a grounding lead 62 and a signal output lead 63 connected as input to amplifier 64. The D-C output voltage from amplifier 64 is proportional to the tristimulus value R' (hereinafter defined) and this is passed as input to the cube root-determining amplifier 67 via switch 65 and resistance network 66, which serve collectively as calibration means for this channel.

As hereinbefore brought out with respect to the Δa equation for the Cube Root Color Coordinate System chosen as an example for the purposes of description of this invention, the specific red spectral distribution employed for Δa determination is actually R, where $$R = 0.8R' + 0.2B$$

Figure 5:
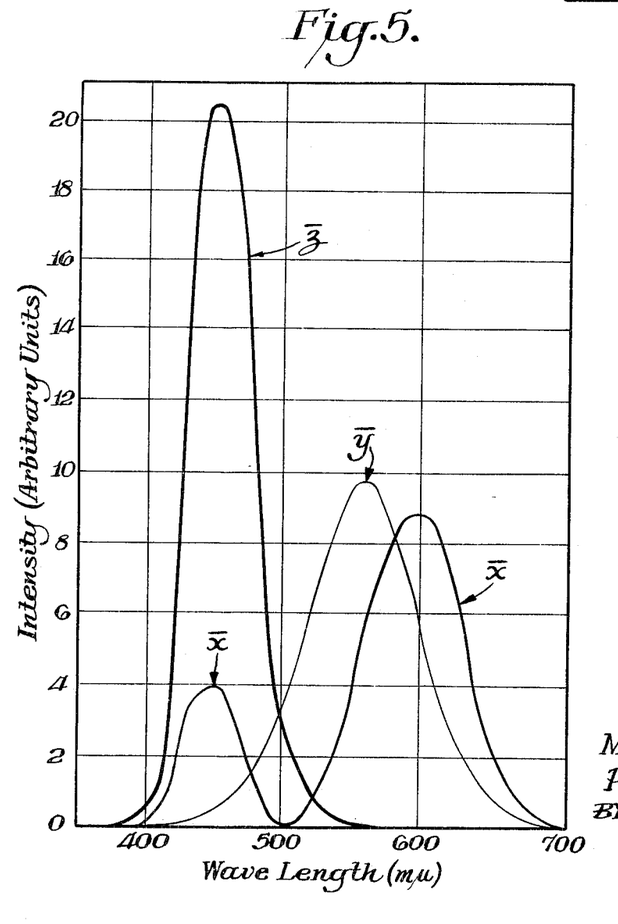
FIG. 5 is a plot representative of the spectral distribution of visible radiation tristimulus response functions as defined by the CIE for a standard observer.

FIG. 5 is a plot of the tristimulus response functions $\bar{x}$, $\bar{y}$ and $\bar{z}$ throughout the range of visible radiation wavelengths, i.e., it is a plot of tristimulus values of equal energy recommended in 1931 by the C.I.E. for a Standard Observer for Colorimetry. Through proper choice of filter-photodetector combinations, signals representing R, G and B can be produced which closely match weighted integrals of the $x$, $y$ and $z$ functions, respectively, over the visible spectrum range.

Referring to FIG. 5, it will be seen that the $\bar{x}$ response, upon which R is predicated, has two peaks, one in the red region (600 mμ) and one in the blue region (450 mμ). To produce the R distribution required for the determination of Δa, it is convenient to utilize a color glass filter 23 in conjunction with a photodetector 28 which, together, produce a signal R', closely matching the 600 mμ peak in the red region of the $\bar{x}$ function, FIG. 5, and combining this with an appropriate portion of the B signal which can closely approximate the peak in the blue region (450 mμ). This can be easily accomplished by taking the B signal, corresponding to the weighted integral of the $\bar{z}$ function, and introducing an appropriate portion of this signal as a second input to amplifier 67 via lead 54 already mentioned.

Consequently, the output of amplifier 67 via lead 68 is an electrical voltage signal constituting $$R_{\text{Ref.}}^{1/3}$$

and $$R_{\text{Sam.}}^{1/3}$$

with the Reference and Sample specimens, respectively, in place over viewing port 17. With sequential viewing, $$-R_{\text{Ref.}}^{1/3}$$

is stored in the same manner as already described for $$-G_{\text{Ref.}}^{1/3}$$

for the ΔL channel and $$B_{\text{Ref.}}^{1/3}$$

for the Δb channel and is introduced via lead 69 when the Reference is viewed, after which $$R_{\text{Sam.}}^{1/3}$$

is delivered via lead 68 and the difference representative of $$(R_{\text{Sam.}}^{1/3} - R_{\text{Ref.}}^{1/3})$$

will be the output voltage signal from amplifier 70 impressed on lead 71. In the same manner described for the Δb channel, Δa requires the combination of redness and greenness information, and this combination is accomplished in amplifier 72. A value of ΔL which is equal to 25.29

$$(G_{\text{Sam.}}^{1/3} - G_{\text{Ref.}}^{1/3})$$

is introduced via lead 45 as one input to amplifier 72, which is set to provide a gain of 106.0/25.29 for this electrical signal voltage to provide the proper coefficient for the ΔL (greenness) contribution to Δa. The second input to amplifier 72 is introduced via lead 71, this being representative of $$(R_{\text{Sam.}}^{1/3} - R_{\text{Ref.}}^{1/3}R)$$

but of opposite polarity to the input from lead 45. The gain of amplifier 70 is adjusted to provide the necessary coefficient for the electrical voltage signal representative of $$(R_{\text{Sam.}}^{1/3} - R_{\text{Ref.}}^{1/3})$$

so that the output of amplifier 72 will be the value of $$\Delta a = 106.0\,[(R_{\text{Sam.}}^{1/3} - R_{\text{Ref.}}^{1/3}) - (G_{\text{Sam.}}^{1/3} - G_{\text{Ref.}}^{1/3})]$$

In this channel, the polarity reversal due to amplifier 72 produces Δa directly, which is impressed on contact $b$ of switch 41, enabling its direct reading on meter 43, due to its reference to ground effected via contact $b$ of switch 42 when the ganged switches simultaneously occupy this position.

Preferred electrical circuitry for the apparatus of FIGS. 1–4, is detailed in FIGS. 6–11, inclusive. Thus, the electro-optical circuit for any one of the three channels employed utilizes a silicon solar cell detector 80, covered with the glass absorption filter 81 adapted to produce the particular green, red or blue tristimulus response for the specific channel involved. The amplifier 82, utilized as an operational amplifier, can be a high-gain, chopper-stabilized, computer type, such as a Philbrick Researches, Inc., Model SP–656, or equivalent, detector 80 being connected across the input of amplifier 82 through terminals 88 and 89. In order to reduce the noise level, standard practice recommended by the amplifier manufacturer is followed whereby terminal 89 is connected to a separate signal ground via lead 83 rather than through the current-carrying common connection 84 of the amplifier.

The amplifier output is delivered to further circuitry via terminal 85 and lead 85' (connected at its other end to terminal 102, FIGS. 7 and 8), feedback being obtained by connection back to summing input 88 through resistor 86 shunted by capacitor 87. Since amplifier 82 has a high open loop gain (typically, approximately $50 \times 10^6$), inputs 88 and 89 are maintained at essentially the same potential (typically less than $1\mu$ volt difference). Consequently, detector 80, connected across these points, is effectively in short circuit operation, thereby providing linearity of detector output current with illumination intensity.

Figure 6:
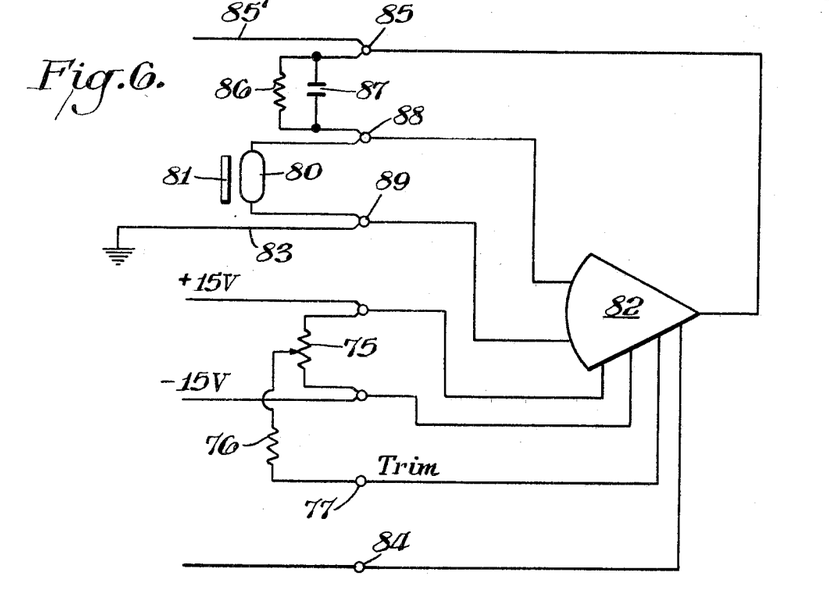
FIG. 6 is a detailed electrical input circuit for one channel of the apparatus of FIGS. 1–4.

The choice of value of feedback resistor 86 can conveniently be such that 1 volt output at connection 85 represents the output for 100% reflectance. The appropriate selection of resistor is made with a calibrated plate in place over port 17, so that the voltage output is the fraction of one volt corresponding to the calibrated reflectance of the plate, since a truly 100% reflectance standard is difficult to maintain. Typical values of resistor 86 are 0.825 megohm for the green, 1.740 megohms for the red and 6.960 megohms for the blue channel. This difference in values is required in order to set the gain of each channel to accommodate the difference in intensity reaching the individual detectors 80 as modified by their associated filters 81, and also to accommodate for the fall off in response to the detectors in the blue end of the spectrum. Enhanced amplifier stability is obtained through the use of the capacitors 87, the typical values of which are 0.001 to 0.002 $\mu f$.

A convenient way of adjusting the amplifier 82 output to zero with zero light signal input is through the use of the trimming circuit recommended by the amplifier manufacturer, consisting of a potentiometer 75, which can, typically, be a 100 kilohm value connected across the $+15$ and $-15$ volt power input of amplifier 82, with a one megohm resistor 76 interposed between the potentiometer wiper and the trimming connection 77 of the amplifier.

Figure 7:
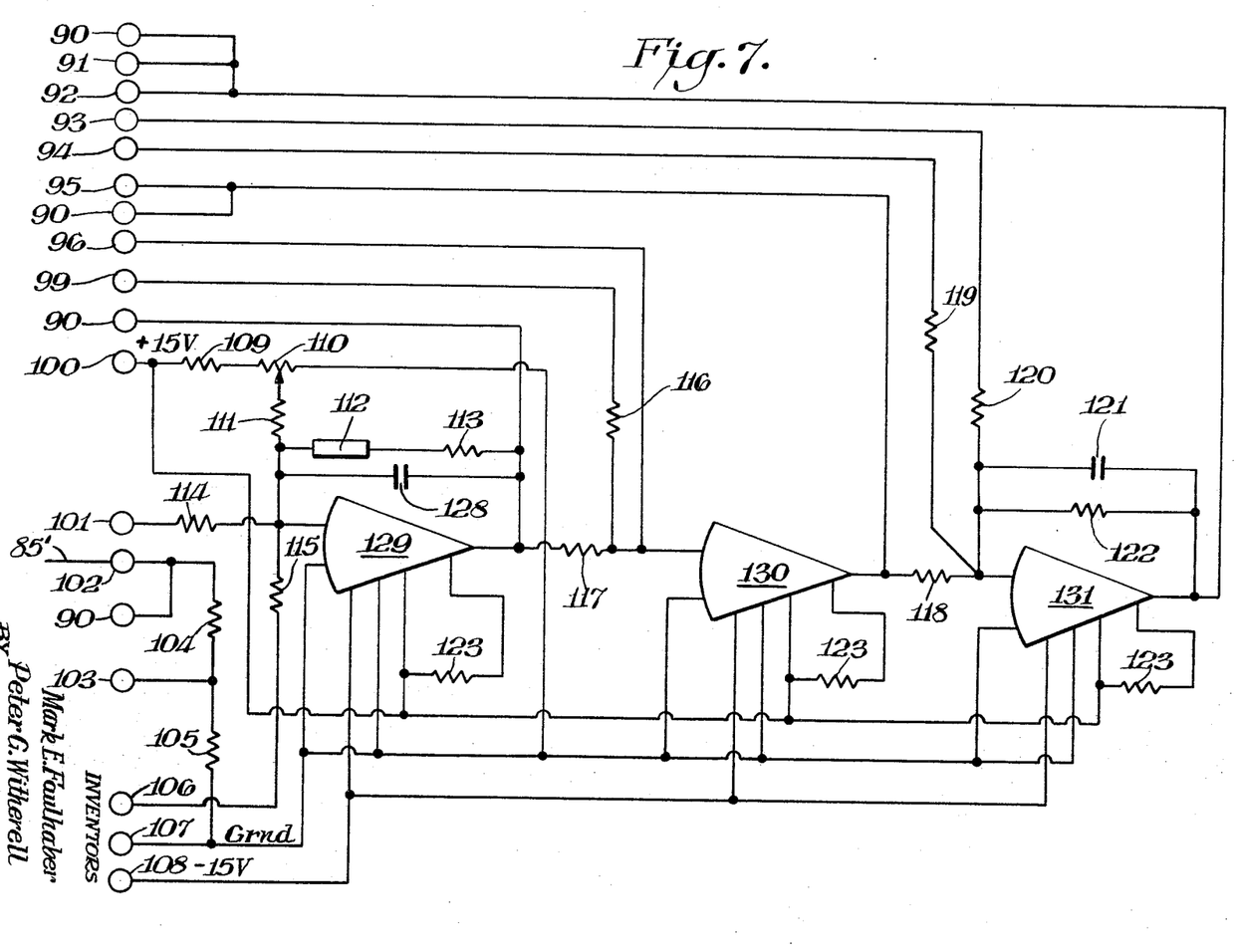

The remaining circuitry, up to ganged switch 41, 42 of FIG. 4, can conveniently be a plug-in circuit board such as that detailed in FIG. 7, usable in any of the three channels of the color difference meter.

Figure 8:
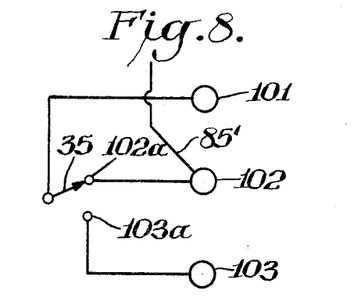
FIG. 8, a calibration network, FIG. 9, a channel gain circuit, FIG. 10, an auto-null circuit and FIG. 11, an auto-null circuit with offset which constitute preferred, although optional or alternative, auxiliaries for use in association with the electrical circuit of FIG. 7.
Figure 9:
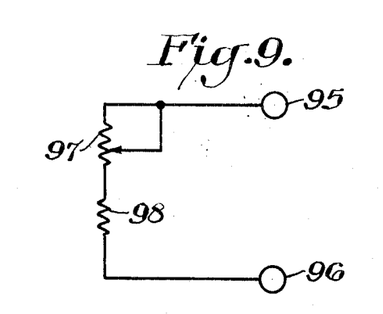

The connection point for the amplifier output lead 85' is to terminal 102 which is in series circuit with ground connection 107 through calibration resistors 104 and 105 (which constitute the calibration networks 34, 53 and 66 of FIG. 4), typically 196 ohms and 1000 ohms, respectively. FIG. 8 shows the connections of a switch corresponding to 35, 52 or 65 of FIG. 4 to provide the calibration function previously mentioned. When switch 35 is closed on its upper contact 102a, direct connection of terminals 101 and 102 is made for normal instrument operation. Moving switch 35 to closure on its lower contact 103a in circuit with terminal 103 establishes direct connection with terminal 101 for calibration.

Amplifier 129, corresponding to amplifier 36, 51 or 67 of FIG. 4, can be a Philbrick Researches type PP65AU, which is provided with negative feedback through fixed resistor 113 in series with nonlinear resistor 112. Resistor 112 is characterized by a relationship of current ($i$) to applied voltage ($e$) of $i=ke^n$, where $n$ is preselected to have a value of approximately 3 in order to compute the cube root of the color values $G^{1/3}$, $R^{1/3}$ and $B^{1/3}$, or to compute the $p$th root, where $p$ is in the approximate range of 2–4, for $G^{1/p}$, $R^{1/p}$ or $B^{1/p}$, in which latter case nonlinear resistor 112 is typically silicon carbide chosen to have an exponent $n$ slightly larger than the desired value of $p$. In practice, a nonlinear resistor 112 consisting of a Carborundum Varistor #432 BNR–62 (nominal value of $n=3.2$) in association with a fixed value resistor 113, typically 2500 ohms, computed cube roots accurately. Shunt capacitor 128 (typically, 20–40 $\mu f$.) provided filtering. Since the filtering furnished by the cube root circuit feedback network has a time constant characterized by the RC product of the network 112, 113, and 128, and since element 112 has nonlinear resistance, the time constant varies with the signal level. In operation the time constant increases at low signal levels, thereby advantageously providing the improved filtering required for low level signals.

Terminal 100 constitutes the $+15$ v. supply point, connected to ground terminal 107 via the series combination of resistor 109 (typically 1000 ohms) and potentiometer 110 (typically 500 ohms). The potentiometer slider is connected through input resistor 111 (typically 150,000 ohms), thereby affording an adjustable positive bias voltage of 0 to $+5$ volts as input to cube root amplifier 129, which bias voltage improves the operation of amplifier 129 as a cube root computer by permitting the operating point of amplifier 129 to be shifted to an optimum operating range by compensating for the change in value of $n$ in the silicon carbide material of resistor 112 at low current levels.

As already described, R is synthesized from predetermined proportions of both the Red and Blue spectra and resistor 115, connected to terminal 106, is provided where the circuit card is used in the $\Delta a$ channel so that a cross connection to the latter from terminal 101 of the $\Delta b$ channel introduces the appropriate B electrical signal. The R' input is via terminal 101 of the FIG. 7 circuit, through resistor 114, with the resistances of elements 114 and 115 being preselected in the ratio of approximately 1:4 to effect the required Blue and Red radiation proportioning. Where the circuit card is employed in the $\Delta L$ or $\Delta b$ channels, no connection is made to terminal 106 and the input to terminal 101 passes through resistor 114 as the usual input resistor for an operational amplifier.

Output of cube root computer 129 is fed through resistor 117 (typically 10 kilohms) to amplifier 130, corresponding to amplifiers 38, 57 or 70, FIG. 4, which can typically be a Philbrick Researches Type PP65AU. The adjustable feedback resistance network for amplifier 130 is detailed in FIG. 9 and comprises, in series connection, resistor 98 and potentiometer 97, connected into the circuit card via terminals 95 and 96. Thus, adjustment of potentiometer 97 sets the gain of amplifier 130, since gain is defined as the ratio of the total feedback resistance to the input resistance, thereby providing preselection of the multiplying coefficients Q, A and N for the $\Delta L$, $\Delta a$ and $\Delta b$ equations, respectively.

The output of amplifier 130 is fed through resistor 118 to amplifier 131, which is provided with a feedback resistor 122 for fixed gain, shunted by capacitor 121 for stabilization. All three amplifiers 129, 130 and 131 have trimming resistors 123 in shunt connection therewith to adjust to substantially zero output for zero input.

When the circuit card is employed in the $\Delta L$ channel, the output from amplifier 131 is fed through terminal 91 to the switch contact 41a, FIG. 4, and is also fed through terminal 92 to lead 45 of the $\Delta a$ channel. Thus, when the circuit card is employed in the $\Delta a$ channel, the output from amplifier 131 withdrawn via terminal 92 of the $\Delta L$ channel is introduced via terminal 93 of the $\Delta a$ channel through resistor 120 to the input of amplifier 131, which now functions as amplifier 72 of FIG. 4. The value of resistor 120 is preselected to provide the coefficient M for the $\Delta L$ term of the $\Delta a$ equation.

Also, when the circuit card is used in the $\Delta b$ channel, the $\Delta L$ channel output is returned via terminal 94 to the input of amplifier 131, which now functions as amplifier 58, FIG. 4, resistor 119 being then preselected to give the coefficient C for $\Delta L$ satisfying the $\Delta b$ equation.

Figure 10:
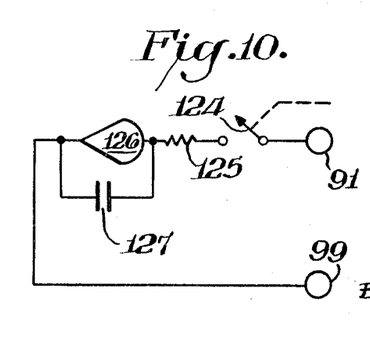

Each channel is provided with an individual automatic nulling circuit of the design detailed in FIG. 10, each driven from its own associated amplifier corresponding to amplifier 131, connected across terminals 91 and 99, nulling being accomplished by momentarily closing switch 124. Switch 124 is a spring-biased normally open three-ganged switch, as indicated by the broken line connection therewith, simultaneously operating all three channels in unison. Resistor 125, amplifier 126 and feedback capacitor 127 function collectively as a feedback integrator, the output signal from which is introduced as input to amplifier 130 via terminal 99, which thus corresponds to leads 44, 55 or 69, FIG. 4. The counter potential effective in the nulling is thus that stored on capacitor 127. Resistor 116 is an appropriate input resistance, typically 10 kilohms.

Thus, when the standard Reference plate is placed over port 17 and the operator momentarily closes switch 124, the automatic nulling circuit of FIG. 10 rapidly charges capacitor 127 to achieve a zero signal at terminal 91 of amplifier 131 by producing a voltage at terminal 99 equal, but of opposite polarity, to the output of amplifier 129. Thus, there is effectively zero input to amplifier 130 and also to amplifier 131, giving effectively zero output from the latter and thus zero signal at terminal 91. Therefore, with zero input applied to the nulling circuit amplifier 126, the charging of capacitor 127 ceases and, when null switch 124 is opened, the capacitor in this integrator circuit effectively "holds" a voltage equivalent to one of the color values, e.g., $$G_{Ref}^{1/3}$$

thereby performing the voltage injection previously described for Green with reference to lead 44 (or Blue for lead 55, or Red for lead 69), FIG. 4. It will be understood that the voltage injection for nulling can be supplied in other ways, as by employing a voltage source and servo-driven potentiometer. However, the circuit of FIG. 10 is preferred because of its fast automatic action. It is important that amplifier 126 have a low drift (e.g., 5 p-amp./° C. and 30 p-amp./24 hr.), an acceptable commercially available design being the Zeltex, Inc., Model 140M15, in which the drift for the $\Delta a$ channel, which is the most sensitive to drift, can be limited to no more than 0.1NBS unit over a ten-minute period, which is a time interval much longer than actually required for routine laboratory color measurements. However, when additional stability is required for process instrumentation in which the reference value might require holding for hours, or even days, of operation, it is preferred to use the previously mentioned servo amplifier-motor combination to position the wiper of a potentiometer across which a voltage is impressed. Such a servo would function in the same manner as described for the circuit of FIG. 10 to position the potentiometer wiper to apply a voltage at the wiper producing zero output from amplifier 131 and simultaneously store the appropriate voltage representative of the cube root value to be held.

The apparatus display meter 43, FIG. 4, not detailed in FIG. 7, can be a digital voltmeter, such as a United Systems Corp., Model 161, the operational inputs of which are obtained by switching 41, 42 and, in addition, which can be intermittently used to read the critical voltages existing throughout the complete circuit by connection with individual ones of the four test points 90 as an aid in calibration and servicing convenience.

It is often desirable to base a color comparison on an available secondary standard as a reference, as, for example, when a primary standard is not available, and still obtain color difference values from the apparatus which are referred to the primary standard. This can be accomplished by providing offset values of the several stored voltages.

Figure 11:
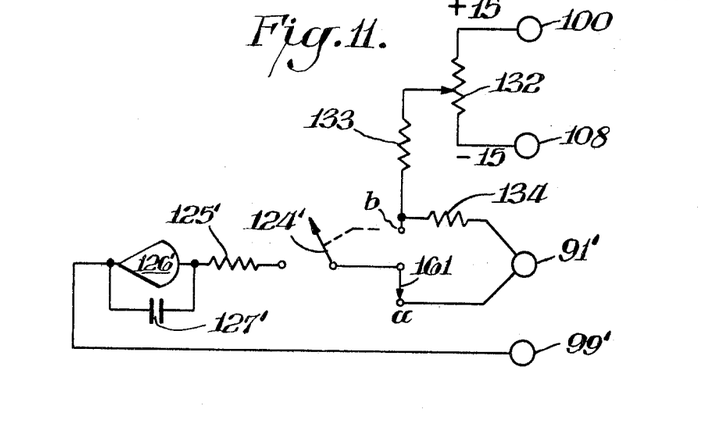

FIG. 11 shows how offsetting can be conveniently incorporated with the autonulling circuit of FIG. 10. In this instance, nulling from a primary standard is accomplished as already described, with switch 161 closed on contact $a$, since the circuitry thereby switched into operation is identical with that hereinbefore taught with respect to FIG. 10.

Now, if it is necessary to employ a secondary standard, offset necessary to refer readings to the primary standard value can be provided by simply shifting switch 161 to closure on the $b$ contact.

Considering the $\Delta L$ channel as an example, the procedure for offset is as follows: With the available secondary standard on viewing port 17, nulling switch 124' is closed as hereinbefore described, whereupon capacitor 127' charges rapidly to produce a zero signal at the juncture of resistors 133 and 134, which is the input to amplifier 126', thereby terminating the charging of capacitor 127'. With the value of resistor 133 equal to that of resistor 134 (typically 10K ohms), the potential introduced to the nulling circuit through resistor 133 when switch 161 is closed on contact $b$ by the positioning of the wiper of potentiometer 132, connected at one end to terminal 100 to which $+15$ v. is applied and at the other end to terminal 108 to which $-15$ v. is applied, must be equal and of opposite polarity to the signal output from amplifier 131 introduced to contact $b$ of switch 161 via resistor 134 connected to terminal 91'. Thus, if it is known that the secondary standard is 0.6NBS unit higher in L than the primary standard, for example, the wiper of potentiometer 132 is set to give a reading on output meter 43 of $+0.6$NBS unit. Then, when 124' is opened, the integrator circuit incorporating capacitor 127' is now storing an appropriate voltage corresponding to $$(-G_{Sec.\ Std.}^{1/3} + \text{offset})$$

or $$(-G_{Prim.\ Std.}^{1/3})$$

at the input to amplifier 130 via terminal 99'. When a sample is placed on viewing port 17, the $\Delta L$ reading on output meter 43 will be referred to the primary standard. Since the offset value is stored by the setting of potentiometer 132, renulling with the secondary standard in place on port 17 can be performed occasionally to correct for drift if the amplifier-capacitor combination described is used, in which case renulling will still refer readings to the primary standard, since the offset value is introduced into the storage or hold circuit each time.

A similar procedure would be used in the $\Delta a$ and $\Delta b$ channels to effect offset operation. It will be seen that the additional circuitry required for offset is very minor, and that operation necessitates only an initial introduction adjustment, after which nothing further is required.

Figure 12:
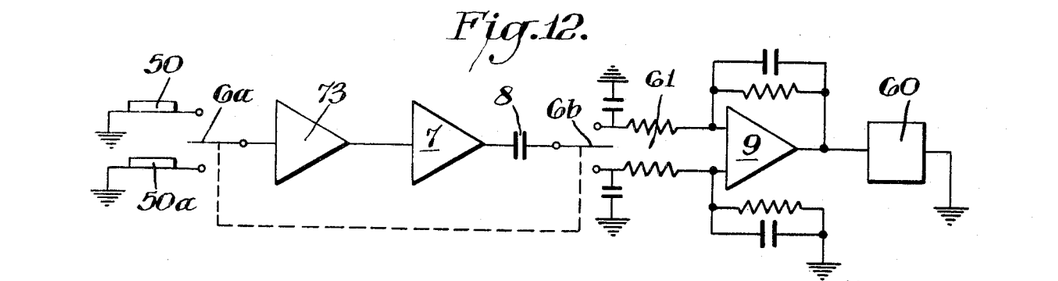
FIG. 12 is a block diagram of a single ($\Delta L$) channel for an embodiment of apparatus according to this invention utilizing simultaneous sample viewing.

The sequential viewing single port embodiment of apparatus which has been hereinbefore described has some advantages as regards lower cost as well as less critical component selection; however, if desired, simultaneous sample viewing with instantaneous color difference indication can be obtained by employment of a synchronous signal chopping arrangement, such as that detailed in the block diagram of FIG. 12 for the $\Delta L$ channel solely. It will be understood that the same techniques would then be applied for the individual $\Delta a$ and $\Delta b$ channels.

Figure 12A:
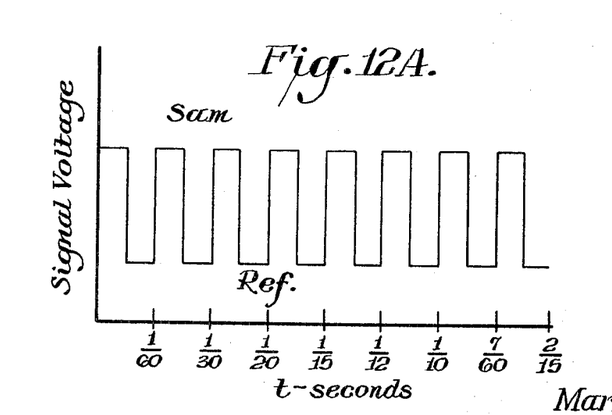
FIG. 12A is a plot representative of the square wave voltage output delivered by amplifiers 7 and 73 of FIG. 12.

Simultaneous sample viewing is effected by providing separate ports for Sample and Reference, in which case the optical arrangement of FIG. 1 would be modified so that the light source would be directed towards the vertex of an inclined light reflector (not shown) having two reflective faces. One face then reflects its radiation at an angle of 45° to one viewing port over which the Sample is placed, while the other simultaneously reflects its radiation at an equal angle to another port over which the Reference is placed. Thus, light reflected from both the Reference (Ref) and Sample (Sam) will be viewed by separate filter-photodetector combinations in each channel, photodetector 50 of FIG. 12 being arbitrarily assigned to the Sample, whereas photodetector 50a is assigned to the Reference. The vibrating switch or chopper, 6a, switches from the signal output of photodetector 50 to the signal output of photodetector 50a, alternately applying each to amplifier 73, to thereby produce a square waveform voltage signal output shown diagrammatically in FIG. 12A for typical 60 cycle frequency operation. The cube root computation amplifier 7 delivers an output similar to that plotted in FIG. 12A, the A-C component of which is proportional to $$(G^{1/3}_{Sam.} - G^{1/3}_{Ref.})$$

Only the A-C component is fed through blocking capacitor 8 to another chopper 6b, synchronized with chopper 6a is indicated by the broken line connection drawn therebetween. Thus, the alternate levels of the A-C component of the cube root signal are fed in synchronism with the input at switch 6a to individual sample-and-hold circuits, indicated generally at 61, and thence to operational amplifier 9 with its separate feedback circuits. The inputs to amplifier 9 are the D-C outputs of the sample-and-hold circuits 61, so that the amplifier 9 output is a D-C voltage proportional to $$(G^{1/3}_{Sam.} - G^{1/3}_{Ref.})$$

which is a measure of $\Delta L$ and is displayed as such on meter 60 through appropriate scaling.

Similar circuits are required for the separate determinations of $\Delta a$ and $\Delta b$ and, as in the sequential embodiment already described, the $\Delta b$ channel utilizes information from both the B and G photodetectors, whereas the $\Delta a$ channel utilizes information from all three photodetectors, thereby increasing the interconnection complexity.

There are several different ways of effecting the three measurements of $\Delta L$, $\Delta a$ and $\Delta b$ in a two-port instrument, three of these being:

(1) The straightforward employment of three channels similar to the $\Delta L$ channel of FIG. 12, in which case the input of each channel would be via a matched pair of photodetectors and filters for either R', G or B. The outputs of the three channels would then be representative of $$R'^{1/3}_{Sam.} - R'^{1/3}_{Ref.}, \; G^{1/3}_{Sam.} - G^{1/3}_{Ref.}$$

and $$B^{1/3}_{Sam.} - B^{1/3}_{Ref.}$$

respectively, and these would be summed and scaled in conventional manner to produce meter readings indicative of $\Delta L$, $\Delta a$ an $\Delta b$.

It is praticable to simplify this design somewhat by switching detectors, thereby eliminating one channel. This is possible because only G information is required for the determination of $\Delta L$, thus necessitating one channel reserved solely to $\Delta L$ evaluation. However, R can be obtained from a single detector receiving its light simultaneously from red and blue filters arranged in side-by-side adjacency, whereas a separate photodetector provided with a blue filter is capable of sensing the B input required for $\Delta b$ evaluation. Thus, with appropriate switching at the signal input end, a single channel can be used intermittently for determining both $\Delta a$ and $\Delta b$ values, although such a dual functioning design would have to incorporate ganged coordinated switching, or the equivalent, in order to handle the later $\Delta L$ and coefficient introduction for each of the values on an individual basis.

The disadvantages of such a system are the need for detector matching, the cost of one or two additional channels, depending upon which alternate is chosen, and the necessity for noise elimination techniques to deal with the noise generated by signal chopping operation.

(2) Another approach would be to use a single channel such as that shown in FIG. 12 for sequential computation of all three of the cube root color value differences, relying on sample-and-hold techniques to preserve the first-obtained.

$$(G^{1/3}_{Sam.} - G^{1/3}_{Ref.})$$

value for subsequent evaluation of $\Delta a$ and $\Delta b$.

This requires additional circuitry for storing $$(G^{1/3}_{Sam.} - G^{1/3}_{Ref.})$$

and also possesses the disadvantage of switching chopping circuitry noise. Moreover, there is a lengthened period of signal storage, which could affect signal integrity, and, because $\Delta G^{1/3}$ always has to be determined first, there must also be a reliance on operator discretion or, alternatively, the provision of expensive instrument interlocks insuring consistent proper sequencing of measurements, which renders such a design less preferred.

Figure 13:
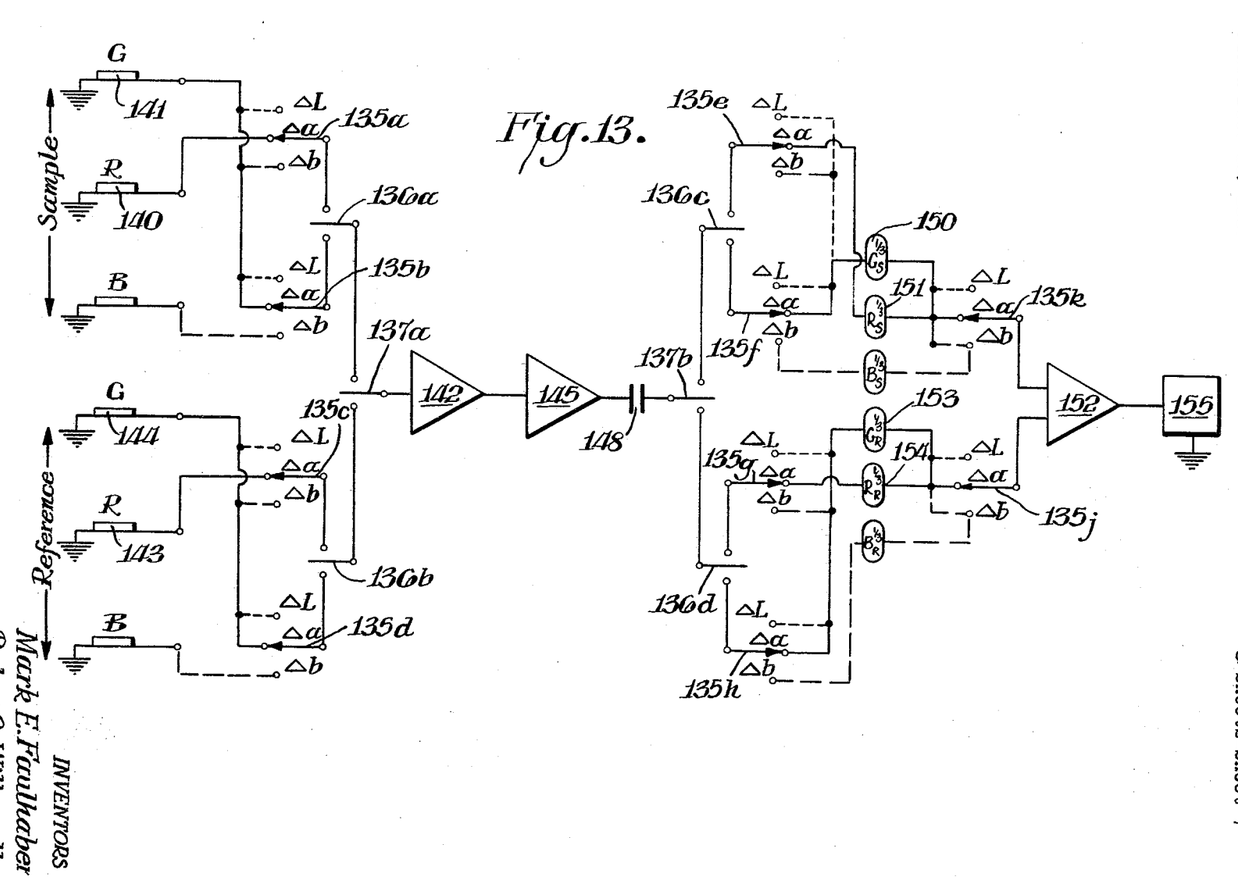
FIG. 13 is a block diagram of yet another embodiment of apparatus according to this invention employing a single channel and a novel chopping combination also adapted to simultaneous sample viewing.

(3) Referring to block diagram FIG. 13, there is shown a preferred system for simultaneous Sample and Reference viewing which utilizes a single channel together with a rather complex switching arrangement and a novel chopping combination. To facilitate ready identification, connections for $\Delta a$ determination, or for common use in all three evaluations, are indicated in solid line representation, whereas those employed for $\Delta L$ evaluation are in short dashed lines and those for $\Delta b$ are in long dashed line convention.

The necessary switching is effected by a single switch having ten sections, all ganged together for synchronous operation throughout the entire system at any one time to effect evaluation of the individual values $\Delta L$, $\Delta a$ and $\Delta b$, (the ganging means being omitted from FIG. 13 because of drawing congestion), these switch sections being denoted 135a–135k in FIG. 13. Single channel operation is made possible through the combination of synchonized cyclic chopping wherein double frequency choppers are used in conjunction with single frequency choppers, the detailed construction herein described employing 120 c.p.s. choppers 136a–136d in combination with 60 c.p.s. choppers 137a and 137b.

The operation will be explained with particular reference to the determination of $\Delta a$. When chopper 137a is in its upper position for one half of its cycle, or 1/20 sec., during which time chopper 136a will go through one full cycle, switching first to the signal from the $R_{Sam}$ detector 140 for the sample color and then to that from the $G_{Sam}$ or green detector 141 for the sample color, these signals are fed to amplifier 142.

Figure 13A:
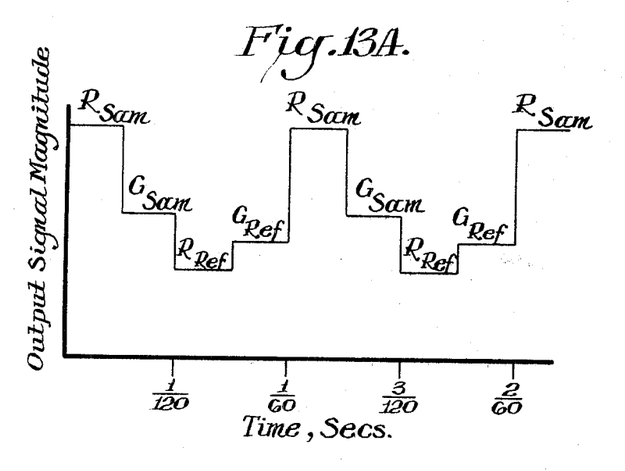
FIGS. 13A and 13B are graphical representations of the square wave output voltages from the amplifier responsive directly to the photodetectors of FIG. 13, shown in FIG. 13A, and from the cube root determination amplifier, FIG. 13B, for $\Delta a$, as shown.
Figure 13B:
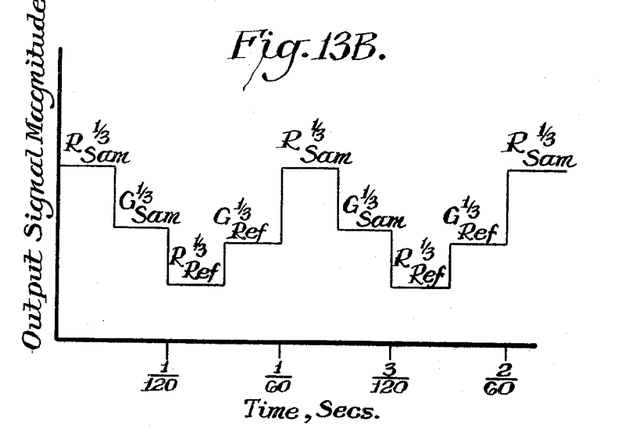

During the next half cycle, when chopper 137a is in its lower position, chopper 136b switches signals from the $R_{Ref}$ and $G_{Ref}$ detectors 143 and 144, respectively, to amplifier 142. The output from amplifier 142 comprises signal voltages which have typical different voltage magnitudes such as those shown in the FIG. 13A plot, the general pattern being a staircase-like signal fed into cube root-computing amplifier 145. The output of cube root amplifier 145 also possesses a staircase-like form, a typical representation being plotted in FIG. 13B.

The output of amplifier 145 is fed through a capacitor 148, thereby removing the D-C level of the signal, and passing on the A-C component which contains $R^{1/3}$ and $G^{1/3}$ information for both the sample and reference colors. This output is fed through 60 c.p.s. chopper 137b, which is, of course, in synchronism with chopper 137a. so that the $$R^{1/3}_{Sam.}$$

signal component is fed into a hold circuit denoted generally at 151 whereas the $$G^{1/3}_{Sam.}$$

signal component is fed into hold circuit 150 as a result of the switching action of chopper 136c synchronized in operation with chopper 136a. These signals are conventionally subtracted and fed into one input of amplifier 152.

Similarly, a $$R^{1/3}_{Ref.}$$

signal is fed into hold circuit 154 and a $$G^{1/3}_{Ref.}$$

signal is fed to hold circuit 153 by action of chopper 136d in synchronism with chopper 136b, after which these signals are conventionally subtracted and fed to the other input of amplifier 152. These signals are combined by conventional summing junction operation of amplifier 152 and the gain of the latter is set such that a voltage is produced which is scaled to indicate $\Delta a$ on meter 155 in accordance with the relationship hereinbefore set out:

$$\Delta a = 106.0[(R_{Sam.}^{1/3} - R_{Ref.}^{1/3}) - (G_{Sam.}^{1/3} - G_{Ref.}^{1/3})]$$

The single channel-two port design of FIG. 13 has the disadvantage of a somewhat complex switching and chopping arrangement and also poses the usual problem of chopping noise suppression and elimination, so that the sequential viewing embodiment of FIGS. 4 and 6–11 is preferred, except where simultaneous sample viewing is essential to successful color comparison.

EXAMPLE

The utility and precision of the color difference meter of this invention is demonstrated by the comparison of color values $\Delta L$, $\Delta a$ and $\Delta b$ evaluated therewith as opposed to measurements made on the identical specimens by a commercially available differential colorimeter marketed for the same service, fabricated in accordance with U.S. Pat. 2,774,276. In obtaining data with the commercial colorimeter, values of G, R' and B were measured with the apparatus and then substituted into the respective equations hereinbefore detailed, permitting separate computation of $\Delta L$, $\Delta a$ and $\Delta b$, which latter are tabulated under the general heading CM.

Using the sequential operating color difference meter of this invention, $\Delta L$, $\Delta a$ and $\Delta b$ were read directly and these tabulated under the heading CDM.

The test was conducted upon sixteen sample pairs, which ranged from fairly high reflectance values to quite dark colors. In three instances a previous reference color was utilized in a succeeding test, i.e., the References denoted as C and H in the following table.

R' and B are known, the rest of the calibration can be achieved.

Thus, referring to FIG. 4, each channel is provided with a calibration switch, such as 35 (for $\Delta L$), 52 (for $\Delta b$) and 65 (for $\Delta a$), and associated resistance networks 34, 53 and 66, respectively. The channels are nulled simultaneously, with the calibration plate in place and with switches 35, 52 and 65 set on their upper contacts. Then, when these switches are thrown to their lower, or calibrate, contacts, a predetermined fraction of the input signal from each detector channel is fed to the input of the cube root circuits. This predetermined fraction is established by appropriate choice of the resistance values of the voltage divider circuits 34, 53 and 66.

With these new signal voltages, the apparatus responds as though a change in sample plate has been made and color difference values are read on meter 43 for $\Delta L$, $\Delta a$ and $\Delta b$. Since the fractional change has been preset by the design of networks 34, 53 and 66, it is possible, once a standardizing plate is procured, to compute the corresponding $\Delta L$, $\Delta a$ and $\Delta b$ calibration values and inscribe these on a plate attached to the apparatus for subsequent use by operators. If the instrument does not read these values when being checked for calibration, recalibration to agree with the inscribed calibration values on the standard plate is accomplished by adjustment of potentiometers 97 of each channel, always adjusting $\Delta L$ prior to adjustment of $\Delta a$ and $\Delta b$.

Experience has shown that a complete calibration is normally required only after a change in light source; however, routine calibration is advisable on a somewhat more frequent basis as, initially, one or more times per eight-hour shift, at least until it is ascertained that fewer calibrations are adequate.

TABLE 1

| Sample | G | R' | B | Ref. | G | R' | B | CDM | | | CM | | |
|---|---|---|---|---|---|---|---|---|---|---|---|---|---|
| | | | | | | | | $\Delta L$ | $\Delta a$ | $\Delta b$ | $\Delta L$ | $\Delta a$ | $\Delta b$ |
| 1 | 86.27 | 86.18 | 84.90 | A | 86.57 | 86.20 | 86.19 | −.20 | .15 | .66 | −.13 | .05 | .72 |
| 2 | 55.80 | 60.88 | 46.56 | B | 55.66 | 60.54 | 47.22 | .08 | .02 | .85 | .08 | −.01 | .85 |
| 3 | 62.92 | 62.26 | 66.06 | C | 52.86 | 52.62 | 55.30 | 5.88 | −.70 | .03 | 5.67 | −.52 | −.35 |
| 4 | 54.44 | 54.60 | 54.82 | C | 52.86 | 52.62 | 55.30 | .99 | −.29 | 2.18 | .94 | −.24 | 2.04 |
| 5 | 50.03 | 48.74 | 62.21 | D | 48.86 | 47.14 | 61.64 | .66 | .73 | .60 | .73 | .53 | .71 |
| 6 | 49.55 | 50.70 | 32.77 | E | 48.57 | 49.64 | 32.52 | .60 | −.17 | .94 | .62 | −.18 | .68 |
| 7 | 31.50 | 32.38 | 29.15 | F | 30.77 | 31.67 | 27.51 | .42 | .14 | −.20 | .57 | 0 | −.30 |
| 8 | 32.20 | 26.28 | 50.16 | G | 30.48 | 24.85 | 46.82 | 1.49 | .53 | −1.41 | 1.46 | .50 | −1.10 |
| 9 | 24.46 | 19.78 | 29.00 | H | 24.60 | 20.15 | 28.80 | −.33 | −.59 | −.35 | −.14 | −.57 | −.53 |
| 10 | 23.34 | 19.66 | 28.84 | H | 24.60 | 20.15 | 28.80 | −.31 | −.95 | −.34 | −.26 | −.65 | −.50 |
| 11 | 24.46 | 19.82 | 28.76 | H | 24.60 | 20.15 | 28.80 | .01 | −.74 | −.02 | −.14 | −6.5 | −.17 |
| 12 | 19.08 | 12.34 | 14.69 | J | 17.97 | 11.66 | 13.79 | 1.35 | −.91 | .14 | 1.34 | −.84 | .08 |
| 13 | 18.83 | 9.50 | 34.42 | K | 17.60 | 8.64 | 31.67 | 1.43 | .93 | −1.53 | 1.50 | 1.30 | −1.26 |
| 14 | 15.38 | 15.38 | 16.69 | L | 15.14 | 15.12 | 16.49 | .06 | .09 | .13 | .33 | .03 | .12 |
| 15 | 9.14 | 21.96 | 1.50 | M | 9.06 | 21.83 | 1.37 | .06 | .52 | −.80 | .15 | .03 | −1.18 |
| 16 | 5.71 | 5.59 | 6.58 | N | 5.30 | 5.46 | 5.37 | .06 | −.85 | −3.03 | 1.11 | −.78 | −3.34 |

Complete analyses of the sixteen pairs of samples with the color difference meter required only about fifteen minutes, whereas the commercial colorimeter took about the same time for the combined measurement and computation of only a single pair. Even when the colorimeter was used in conjunction with a color difference computer of the design patented in U.S. Pat. 3,233,087 a total time of approximately one hour was required for the sixteen pairs, with ample opportunity for error in the data handling constituting a constant hazard.

It was found that there was very acceptable agreement between color evaluations made on the color difference meter and the standard commercial colorimeter widely employed in the art, the standard deviations (in N.B.S. units) computed from the test reported being only 0.13 for $\Delta L$, 0.19 for $\Delta a$, and 0.22 for $\Delta b$.

Calibration of the apparatus of this invention is straightforward and provides a simple complete check of both the optics and the electronics. It is practicable, through the use of a clean first-surface mirror or a black Carrara marble plaque, to effect zero reflectance zeroing of the green, red and blue channels. Then, with a single reference plate (preferably a high reflectance white plate for highest accuracy) for which the reflectance values G, From the foregoing description it will be understood that this invention can be modified in numerous respects within the skill of the art without departure from its essential spirit.

What is claimed is:

1. A colorimeter determining directly the visually uniform color difference coordinate values $$\Delta L = Q(G_{Sam.}^{1/p} - G_{Ref.}^{1/p})$$

$$\Delta a = A(R_{Sam.}^{1/p} - R_{Ref.}^{1/p}) - M\Delta L$$

and $$\Delta b = C\Delta L - N(B_{Sam.}^{1/p} - B_{Ref.}^{1/p})$$

existing between a pair of specimens consisting of a Sample (Sam) and a Reference (Ref), wherein Q, A, C, M and N are constants, $p$ is a number in the approximate range of 2–4 and G, R and B are, respectively, radiation intensities corresponding to preselected portions of the green, red and blue spectra comprising, in combination and in optical train, a radiation source,
means supporting individual ones of said specimens Sam and Ref which it is desired to compare,
radiation filters individually transmitting said preselected portions of said green, red and blue spectra, and radiation responsive photodetection means matched with said radiation source and said radiation filters generating electrical signtls which are functions of said G, R and B radiation intensities received from individual ones of said specimens, means individually amplifying said electrical signals for first said Ref and then said Sam specimens, computing the $p$th roots thereof to thereby obtain electrical voltage signals corresponding to $$G_{Ref.}^{1/p}, R_{Ref.}^{1/p}, B_{Ref.}^{1/p}, G_{Sam.}^{1/p}, R_{Sam.}^{1/p}$$

and $$B_{Sam.}^{1/p}$$

and nulling individual $p$th roots for said Ref specimen against external potential sources of substantially equal voltage magnitude to effectively preserve the magnitude of electrical voltage signals corresponding to $$G_{Ref.}^{1/p}, R_{Ref.}^{1/p} \text{ and } B_{Ref.}^{1/p}$$

respectively, means subtracting the preserved electrical voltage corresponding to $$G_{Ref.}^{1/p}$$

from the $$G_{Sam.}^{1/p}$$

one of said electrical voltage signals to obtain the difference $$(G_{Sam.}^{1/p} - G_{Ref.}^{1/p})$$

and multiplying said difference by said constant Q to obtain an electrical voltage signal corresponding to said color difference coordinate value $\Delta L$, means subtracting the preserved electrical voltage corresponding to $$R_{Ref.}^{1/p}$$

from the $$R_{Sam.}^{1/p}$$

one of said electrical voltage signals to obtain the difference $$(R_{Sam.}^{1/p} - R_{Ref.}^{1/p})$$

and multiplying said last-named difference by said constant A to obtain an electrical voltage signal corresponding to the product $$A(R_{Sam.}^{1/p} - R_{Ref.}^{1/p})$$

means multiplying said electrical voltage signal corresponding to said color difference coordinate value $\Delta L$ by said constant M to obtain an electrical voltage signal corresponding to the product $M\Delta L$, means subtracting said electrical voltage signal corresponding to said product $M\Delta L$ from said electrical voltage signal corresponding to said product $$A(R_{Sam.}^{1/p} - R_{Ref.}^{1/p})$$

to obtain an electrical voltage signal corresponding to said color difference coordinate value $\Delta a$, means multiplying said electrical voltage signal corresponding to said color difference coordinate value $\Delta L$ by said constant C to obtain an electrical voltage signal corresponding to the product C ($\Delta L$), means subtracting the preserved electrical voltage corresponding to $$B_{Ref.}^{1/p}$$

from the $$B_{Sam.}^{1/p}$$

one of said electrical voltage signals to obtain the difference $$(B_{Sam.}^{1/p} - B_{Ref.}^{1/p})$$

and multiplying said last-named difference by said constant N to obtain an electrical voltage signal corresponding to the product $$N(B_{Sam.}^{1/p} - B_{Ref.}^{1/p})$$

means subtracting said electrical voltage signal corresponding to said product $$N(B_{Sam.}^{1/p} - B_{Ref.}^{1/p})$$

from said electrical voltage signal corresponding to said product C $\Delta L$ to obtain an electrical voltage signal corresponding to said color difference coordinate value $\Delta b$, and means indicating the magnitudes of said color difference coordinate values $\Delta L$, $\Delta a$ and $\Delta b$.

2. A colorimeter according to claim 1 provided with means sampling said pair of specimens sequentially and intermittently to obtain said electrical signals which are functions of said G, R and B radiation intensities received from individual ones of said specimens.

References Cited

UNITED STATES PATENTS 3,233,087   2/1966   Faulhaber et al. ______ 235—193

OTHER REFERENCES

Lewis, E. L., "Colorede: Color Measurement for Continuous Textile Dying," Am. Dyestuff Reporter, July 20, 1964, pp. 30–35.

RONALD L. WIBERT, Primary Examiner

R. J. WEBSTER, Assistant Examiner

U.S. Cl. X.R.

209—111.5; 235—184; 250—226